US009520985B2

(12) United States Patent
Choi et al.

(10) Patent No.: US 9,520,985 B2
(45) Date of Patent: Dec. 13, 2016

(54) TUNING ALGORITHM FOR MULTI-TAP SIGNAL CANCELLATION CIRCUIT

(71) Applicant: Kumu Networks, Santa Clara, CA (US)

(72) Inventors: Jung-il Choi, Sunnyvale, CA (US); Mayank Jain, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 457 days.

(21) Appl. No.: 14/158,711

(22) Filed: Jan. 17, 2014

(65) Prior Publication Data

US 2014/0204808 A1     Jul. 24, 2014

Related U.S. Application Data

(60) Provisional application No. 61/754,447, filed on Jan. 18, 2013.

(51) Int. Cl.
*H04B 7/005* (2006.01)
*H04L 5/14* (2006.01)

(52) U.S. Cl.
CPC ............. *H04L 5/1461* (2013.01); *H04L 5/143* (2013.01)

(58) Field of Classification Search
CPC .. H04L 5/1461; H04L 5/143; H04L 25/03019; H04B 1/525; H04B 1/71052
See application file for complete search history.

(56) References Cited

U.S. PATENT DOCUMENTS

| | | | | |
|---|---|---|---|---|
| 5,463,424 A * | 10/1995 | Dressler | ................... | H04S 3/02 348/485 |
| 2004/0071103 A1* | 4/2004 | Henttu | ................. | H04B 1/7105 370/320 |
| 2005/0265429 A1* | 12/2005 | Cho | ....................... | H04B 1/715 375/135 |
| 2006/0133462 A1* | 6/2006 | Nguyen | ............. | H04B 1/71052 375/150 |
| 2012/0201173 A1* | 8/2012 | Jain | ........................ | H04B 1/525 370/277 |
| 2012/0287969 A1* | 11/2012 | Ganti | ..................... | H04B 1/525 375/219 |
| 2012/0314560 A1* | 12/2012 | Alapuranen | ........ | H04L 27/2647 370/210 |

\* cited by examiner

*Primary Examiner* — Man Phan
*Assistant Examiner* — Ryan Kavleski
(74) *Attorney, Agent, or Firm* — Jeffrey Schox; Thomas Gwinn

(57) ABSTRACT

A self-interference signal cancellation circuit includes a transmitter for transmitting a transmit signal, a plurality of signal paths, a controller, and a receiver for receiving a signal. Each signal path includes a delay element and a variable attenuator having attenuation levels set by the controller. A combiner generates an output signal by combining outputs of the signal paths. The circuit computes a matrix based on first and second output signals associated with first and second attenuation levels. The controller concurrently varies the attenuation level of each signal path so that a product of the matrix and the attenuation levels of the signal paths is substantially equal to the received signal. The circuit may iteratively compute the matrix using different transmit signal frequencies or with an FFT. The controller iteratively varies the attenuation level of the attenuators until a sum of the product and the received signal satisfies a predefined condition.

28 Claims, 4 Drawing Sheets

TUNING ALGORITHM FOR MULTI-TAP SIGNAL CANCELLATION CIRCUIT

CROSS-REFERENCES TO RELATED APPLICATIONS

The present application claims benefit under 35 §U.S.C. 119(e) of U.S. Provisional Patent Application No. 61/754,447, filed Jan. 18, 2013, entitled "Tuning Algorithm for Multi-Tap Signal Cancellation Circuit", the content of which is incorporated herein by reference in its entirety.

The present application is related to application Ser. No. 14/106,664, filed Dec. 13, 2013, entitled "Feed Forward Signal Cancellation", the content of which is incorporated herein by reference in their entirety.

FIELD OF THE INVENTION

The present invention relates to wireless communication, and more particularly to a full duplex wireless communication system.

BACKGROUND OF THE INVENTION

A wireless system often operates in a half-duplex mode to either transmit or receive data at any given time. A device operating in a full-duplex mode may simultaneously transmit and receive data. However, the simultaneous transmission and reception of data are carried out over different frequencies. For example, a full-duplex cell phone uses a first frequency for transmission and a second frequency for reception. As is well known, using the same frequency for simultaneous transmission and reception in a conventional wireless system results in significant amount of self-interference at the receiver, thereby, rendering the system ineffective in receiving the desired signal.

BRIEF SUMMARY OF THE INVENTION

A circuit, in accordance with one embodiment of the present invention, includes a transmitter for transmitting a transmit signal at a selected frequency, a plurality of signal paths, a controller unit, and a receiver for receiving a signal. Each signal path includes a delay element and a variable attenuator having attenuation levels that can be set by the controller unit. A combiner generates an output signal by combining outputs of all the signal paths. The circuit computes a matrix based on first and second output signals associated with first and second attenuation levels. The controller circuit concurrently varies the attenuation level of each signal path so that a product of the matrix and the attenuation levels of the signal paths is substantially equal to the received signal.

In one embodiment, the circuit further includes, at least one antenna for receiving a signal. In one embodiment, each of the signal paths is adapted to receive a sample of a transmit signal and generate a delayed and weighted sample of the transmit signal. In one embodiment, the circuit further includes a plurality of passive couplers adapted to change a phase of one or more delayed and weighted signal paths in relation to the transmit signal, and a coupler adapted to subtract the result of the product from the receive signal. The circuit can iteratively compute the matrix using different transmit signal frequencies or by taking a frequency domain representation of the response to a wideband transmit signal, such as taking the fast Fourier transform.

In one embodiment, the circuit computes the matrix by applying a wideband transmit signal to the signal paths and computing the Fourier transform of the transmit signal and receive signal. The matrix may be a complex M×N matrix, where M is the number of frequency bins in the Fourier transform and N is the number of signal paths. The frequency domain representation of the received signal may be a complex M×1 column vector, and the attenuation level of each signal path is an element of a real N×1 column vector. In one embodiment, the product of the matrix and the attenuation levels of the signal paths is a complex M×1 column vector that is substantially equal to the received signal.

In one embodiment, the circuit further includes a circulator having a first port coupled to an antenna, a second port coupled to a transmit line of the circuit, and a third port coupled to a receive line of the circuit. In one embodiment, the second port of the circulator is disconnected from the transmit line while the attenuation levels are set, output signals are obtained for the computation of the matrix. In one embodiment, the third port of the circulator is connected to the receive line and all attenuators are set to the maximum attenuation level while the signal is received by the receiver.

In one embodiment, the controller unit iteratively varies the attenuation level of each variable attenuator until a sum of the product and the received signal satisfies a predefined condition.

Embodiments of the present invention also provide a method for performing a self-interference signal cancellation in a full-duplex wireless communication system with a cancellation circuit. The method includes supplying a sample of a transmit signal at a first frequency by a transmitter to the cancellation circuit. The cancellation circuit includes a plurality of parallel signal paths, each of the signal paths includes a delay element and a variable attenuator. The method further includes setting a first attenuation level to one or more of the variable attenuators, obtaining a first output signal of the cancellation circuit, setting a second attenuation level to the one or more of the variable attenuators, and obtaining a second output signal of the cancellation circuit. The method also includes generating a matrix based on the first and second output signals, receiving a signal at a receiver, and varying an attenuation level of each of the variable attenuators so that a product of the matrix and the attenuation levels is substantially equal to the received signal.

The method, in accordance with one embodiment of the present invention, further includes, supplying the sample of the transmit signal at a second frequency by the transmitter to the cancellation circuit, setting the first attenuation level to the one or more of the variable attenuators, obtaining a third output signal of the cancellation circuit, setting the second attenuation level to the one or more of the variable attenuators, obtaining a fourth output signal of the cancellation circuit, and expanding the matrix based on the third and fourth output signals. The method can iteratively repeat the above steps with a third, a fourth frequencies to expand the matrix.

In one embodiment, the matrix can be expanded to an M×N matrix, where M is the number of transmit signal frequencies and N is the number of signal paths of the cancellation circuit.

In one embodiment, the first attenuation level is the maximum attenuation level and the second attenuation level is the minimum attenuation level. In one embodiment, the first and second attenuation levels are applied to the variable attenuators of all of the signal paths.

In one embodiment, the method further includes iteratively varying the attenuation level of each variable attenuator until a sum of the product and the received signal satisfied a predefined condition.

The following description, together with the accompanying drawings, will provide a better understanding of the nature and advantages of the claimed invention.

DETAILED DESCRIPTION OF THE INVENTION

Embodiments of the present invention will be described more fully hereinafter with reference to the accompanying drawings. This invention may, however, be embodied in many different forms and should not be construed as limited to the embodiments set forth herein. Like numbers refer to like elements throughout.

It is understood that the term "vector" is a synonym for signal. The terms "complex vector" and "real vector" are synonyms for complex signal and real signal, respectively. A vector can be an analog signal including an analog component I(f), Q(f), or a digital signal including a digital component I(n), Q(n). A complex vector include a complex-valued signal I+jQ. A column vector is an m×1 matrix, i.e., a matrix consisting of a single column of m elements. A m×n matrix is a matrix consisting of m rows and n columns.

Figure 1:
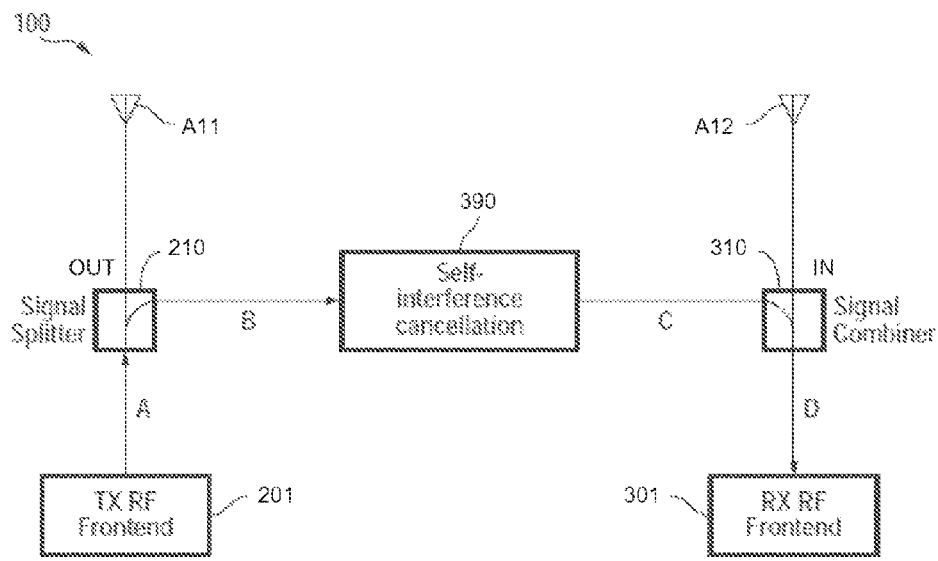
FIG. 1 is a simplified block diagram of a full-duplex wireless communication system, in accordance with one embodiment of the present invention.

FIG. 1 is a simplified block diagram of a full-duplex wireless communication device 100, in accordance with one embodiment of the present invention. Wireless communication device 100, which may be a cellular phone, a base station, an access point or the like, is configured to transmit data/signals via transmit antenna A11 and receive data/signals via a receive antenna A12. Wireless communication device (herein alternatively referred to as device) 100 is also shown, as including, a transmit front-end 201, a signal splitter 210, a receive front end 301, a signal combiner 310, and a self-interference cancellation circuit 390. Device 100 may be compatible and operate in conformity with one or more communication standards such as WiFi™, Bluetooth®, GSM EDGE Radio Access Network ("GERAN"), Universal Terrestrial Radio Access Network ("UTRAN"), Evolved Universal Terrestrial Radio Access Network ("E-UTRAN"), Long-Term Evolution (LTE), and the like.

Transmit front-end 201 is adapted to process and generate transmit signal A. Signal splitter 210 splits the transmit signal and delivers a portion (sample) of this signal, i.e., signal B, to self-interference cancellation circuit 390. The remaining portion of the transmit signal, which is relatively large (e.g., 85% of the transmit signal) is delivered to transmit antenna A11. Because the transmit and receive antenna A11 and A12 operate in substantially the same frequency band, signal IN received by receive antenna A12 includes the desired signal as well as a portion of the transmitted signal OUT. The transmitted signal component that is received by antenna A12 is an undesirable signal and is referred to hereinafter as the self-interference signal. Self-interference cancellation circuit 390 operates to reconstruct the self-interference signal, which is subsequently subtracted from the received signal IN. To achieve this, self-interference cancellation circuit 390 generates a multitude of weighted and delayed samples of the transmit signal, and combine these signals to generate signal C that is representative of the self-interference signal. Signal combiner 310 is adapted to subtract the signal it receives from self-interference cancellation circuit 390 from the signal it receives from antenna A12, thereby to deliver the resulting signal D to receive front-end 300. Accordingly, the self-interference component of the signal received by receive front-end 300 is substantially degraded. In one embodiment, self-cancellation circuit 390 may cancel, e.g., 20-25 dB of the self-interference signal.

Figure 2:
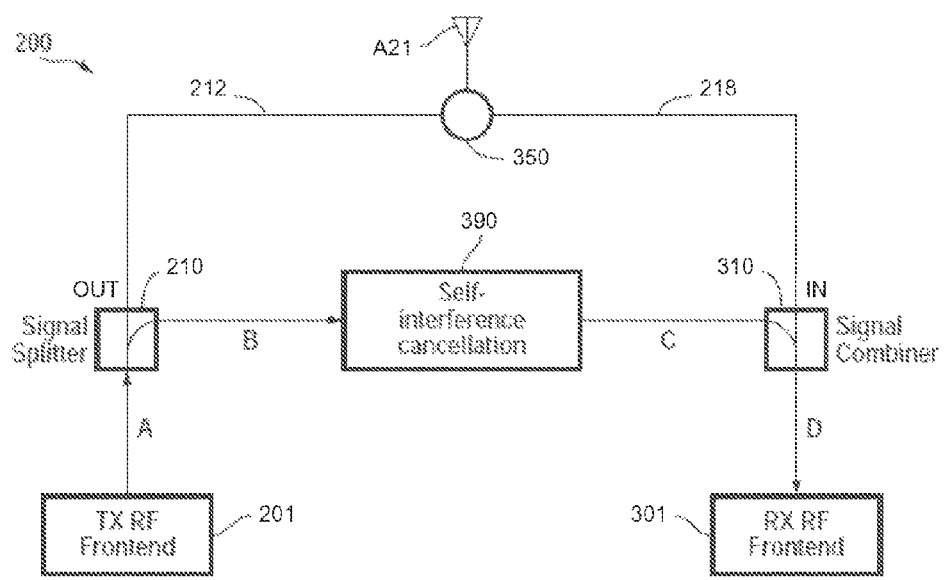
FIG. 2 is a simplified block diagram of a full-duplex wireless communication system, in accordance with one embodiment of the present invention.

FIG. 2 is a simplified block diagram of a full-duplex wireless communication device (hereinafter alternatively referred to as device) 200, in accordance with another embodiment of the present invention. Device 200 is similar to device 100 except that device 200 has a single antenna A21 used for both transmission and reception of signals. Device 200 also includes a circulator 350 that provides isolation between its ports. Circulator 350 is adapted to concurrently deliver the transmit signal and the receive signal to and from antenna A21. In one exemplary embodiment, circulator 350 provides approximately 15 dB of isolation between the transmit and receive paths, thereby reducing the self-interference on the receive port by approximately 15 dB.

Figure 3:
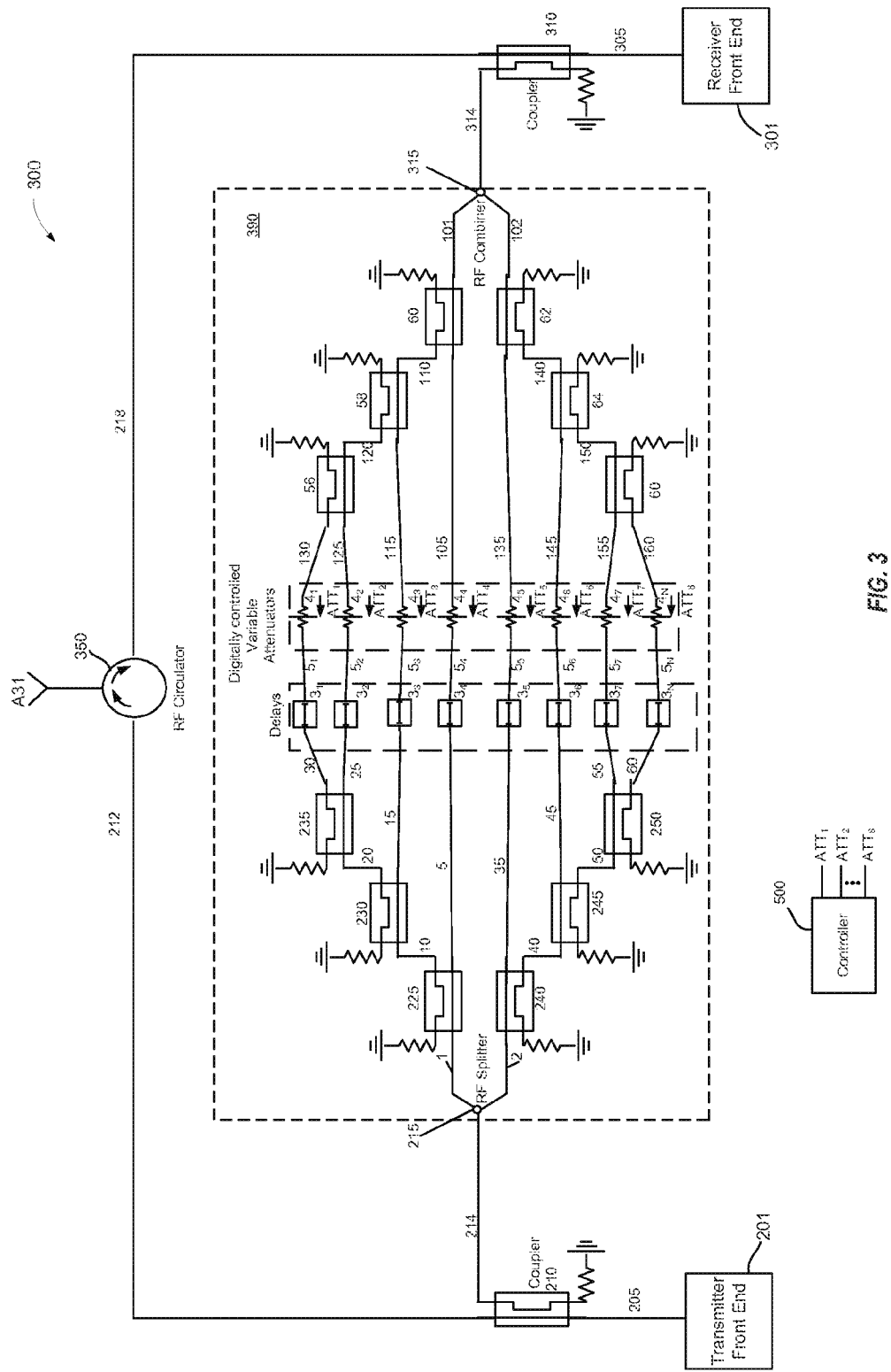
FIG. 3 is a simplified block diagram of a full-duplex wireless communication system, in accordance with one embodiment of the present invention.

FIG. 3 is a simplified block diagram of a full-duplex wireless communication device (hereinafter alternatively referred to as device) 300, in accordance with one exemplary embodiment of the present invention. Device 300 is shown as including a transmitter front end 201, a receiver front end 301, a transmit/receive antenna A31, a circulator 350, and a self-interference cancellation circuit 390 as is also disposed in devices 100 and 200 shown in FIGS. 1 and 2, respectively. Transmitter front end 201 receives a complex digital signal I(n)+jQ(n), converts the complex digital signal into an analog signal I(f)+jQ(f), and frequency translates the analog signal to a RF transmit signal 205. Coupler 210 receives a sample of transmit signal 205 and in response delivers a through signal 212 to circulator 350, and a coupled signal 214 to splitter 215. Self-interference signal cancellation circuit 390 is adapted to reconstruct the self-interference signal 314 from the sample of the transmit signal 214. The reconstructed self-interference signal 314 is subtracted from received signal 218 by coupler 310 thereby to recover the signal of interest 305, also referred to as the desired signal. The desired signal 305 is delivered to receiver front end 301 for further processing.

Although FIG. 3 is shown as having 8 taps $5_1, 5_2, 5_3, 5_4, 5_5, 5_6, 5_7, 5_8$, it is understood that a signal cancellation circuit in accordance with embodiments of the present invention may have any number of taps. Signal cancellation circuit 390 is adapted to enable full duplex wireless communication by canceling or minimizing the self-interference signal received by receiver 301 and caused by signal transmission at transmitter 201.

Signal cancellation circuit 390 is adapted to receive a sample of the transmitted signal 205 (self-interference signal) transmitted by transmitter 201, reconstruct the self-interference signal from the received samples, and cancel the reconstructed signal from received signal 305 thereby to recover the signal of interest, also referred to as the desired signal. Signal cancellation circuit 390 is described in detail in US Application No. 61/736,726, the content of which is incorporated herein by reference in its entirety.

In the following, for simplicity, the same reference number may be used to identify both the path through which a signal travels, as well as to the signal which travels through that path. For example, reference numeral 25 may be used to refer to the signal so identified in FIG. 3, or alternatively to the path through which this signal travels. Furthermore, in the following, the terms splitter, coupler, or combiner are alternatively used to refer to an element adapted to split/divide a signal to generate more signals and/or couple/combine a multitude of signals to generate one or more signals. Such a component is also alternatively referred to herein as splitter/coupler. Furthermore, using couplers for signal distribution and combination is only one example. It is understood that other isolating components or a pair of antennas may be used instead of a circulator.

Signal cancellation circuit 390 is shown as including, eight variable attenuators $4_1$, $4_2$, $4_3$, $4_4$, $4_5$, $4_6$, $4_7$, $4_8$ each adapted to attenuate the signal it receives from its associated delay element in accordance with a different attenuation signal $ATT_1$-$ATT_8$. Accordingly, signals 130, 125, 115, 105, 135, 145, 155, 160 supplied respectively by variable attenuators $4_1$, $4_2$, $4_3$, $4_4$, $4_5$, $4_6$, $4_7$, $4_8$ (alternatively and collectively referred to herein using reference number 4) are time-delayed, weighted signal samples that are used to reconstruct the self-interference component of the transmitted signal.

In accordance with the present invention, the attenuation signals $ATT_1$-$ATT_8$ applied to variable attenuators $4_1$, $4_2$, $4_3$, $4_4$, $4_5$, $4_6$, $4_7$, $4_8$ are selected so as to maximize the matching between signals 314 and 218—respectively supplied by coupler 315 and circulator 350—in order to achieve maximum cancellation. To achieve this, the cancellation paths (8 in the exemplary embodiment shown in FIG. 3) are first characterized for a number of different frequencies. One such characterization includes generating a complex response plot (also known as polar plot) of the cancellation circuit after disconnecting the self-interference path, i.e., disconnecting path 218 from coupler 310. As is well known, a complex plot shows the real and imaginary parts of a signal on x-axis and y-axis respectively. One may obtain the complex response plot by dividing the frequency domain representation of the received signal by the frequency domain representation of the transmitted signal, commonly known as the channel response. Alternatively, the received signal may be used without such division if the same transmit signal is used across all measurements.

Figure 4:
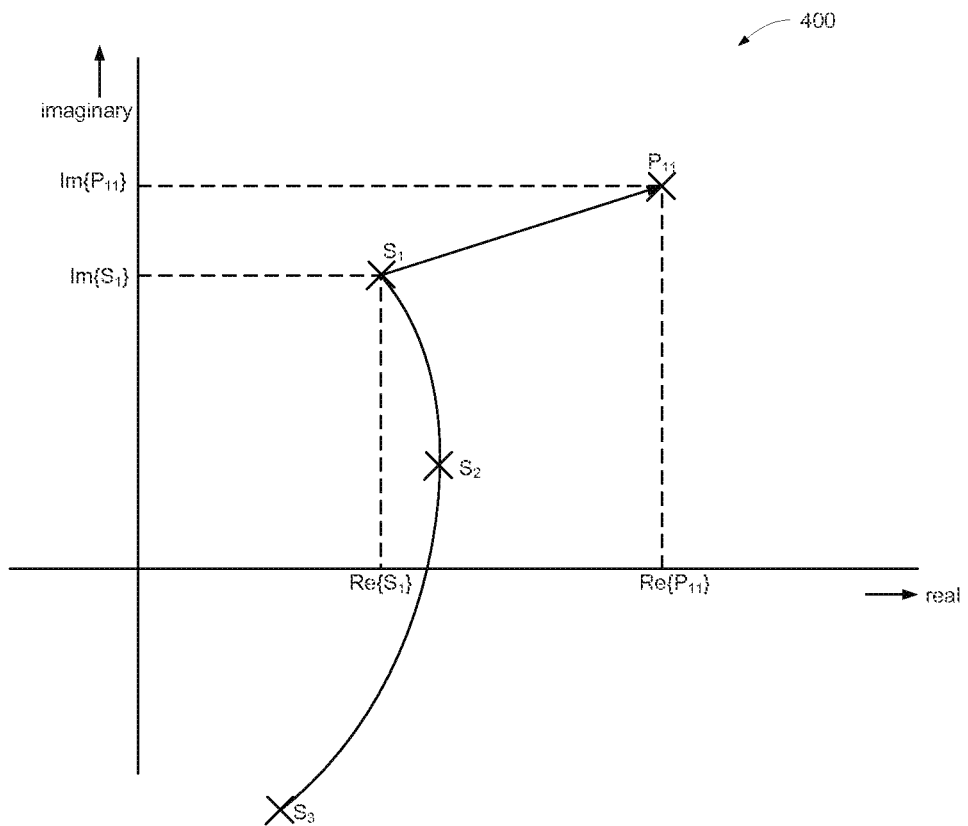
FIG. 4 is a graph showing an exemplary response plot associated with different frequencies and attenuation levels of the self-interference cancellation circuit of FIG. 3, in accordance with one embodiment of the present invention.

In one embodiment, the attenuation signals applied to the attenuators are initially set to a maximum value. Next, signal 314 generated by the cancellation circuit at the output of coupler 315 is measured at a first frequency $f_1$, thus defining a first starting point, as described further below. Such a measurement is repeated N times at N different frequencies to generate N starting points each associated with a different one of the N frequencies. FIG. 4 shows a plot 400 of the N responses. Exemplary points $s_1$, $s_2$, and $s_3$ respectively show the response of the cancellation circuit at the output of coupler 315 at frequencies $f_1$, $f_2$ and $f_3$. The response at N frequency points can also be measured by transmitting a single wideband signal and measuring the N-point frequency domain representation of the response.

If the level of attenuation applied to any of the attenuators is varied from a maximum value to a minimum value at any given frequency, the response of the cancellation circuit is observed as following a substantially linear path on the complex plane. For example, assume that at frequency fond with the maximum amount of attenuation applied to attenuator $4_1$, the starting point (response of the cancellation circuit with the circulator path disconnected) is represented by $s_1$. If the attenuation level $ATT_1$ is subsequently changed from the maximum attention level to a lower attenuation level, the response of the cancellation circuit at frequency $f_1$ is observed as traversing a linear path from point $s_1$ to point $p_{11}$ defined by:

$$\mathrm{imag}\{p_{11}\}=\mathrm{imag}\{s_1\}+m_{11}*(\mathrm{real}\{p_{11}\}-\mathrm{real}\{s_1\}) \tag{1}$$

Where $p_{11}$ represents the cancellation circuit's response at frequency $f_1$, and $m_{11}$ represents the slope of the line connecting points $s_1$ and $p_{11}$, as shown in FIG. 4.

It is also determined that the complex output response changes linearly with $$10^{\frac{ATT_i}{20}},$$

where $ATT_i$ represents the attenuation level applied to attenuator $4_i$ in dB. For a frequency $f_j$, the complex output response may thus be defined as:

$$p_{ij} = s_j + m_{ij} * 10^{\frac{ATT_i}{20}} \tag{2}$$

Assume that the attenuation levels $ATT_1$ and $ATT_2$ are applied to attenuators $4_1$ and $4_2$ while the frequency is maintained at $f_1$. The superposition principle is then used to determine the system's response, as shown below:

$$p_1 = s_1 + m_{11} * 10^{\frac{ATT_1}{20}} + m_{21} * 10^{\frac{ATT_2}{20}} \tag{3}$$

Likewise, assume that the attenuation levels $ATT_1$ and $ATT_2$ are applied to attenuators $4_1$ and $4_2$ while the frequency is maintained at $f_2$. The superposition principle is then used to determine the system's response, as shown below:

$$p_2 = s_2 + m_{12} * 10^{\frac{ATT_1}{20}} + m_{22} * 10^{\frac{ATT_2}{20}} \tag{4}$$

Assuming that the cancellation circuit responses are measured at three different frequencies, namely $f_1$, $f_2$, and $f_3$, and the attenuation levels, $ATT_1$-$ATT_8$ are varied concurrently during each sub-frequency, the response of the cancellation circuit may be represented by:

$$P_f = M * ATT \tag{5}$$

In expression (5), $P_f$ is a complex column vector defined by:

$$\begin{bmatrix} P_{f1} \\ P_{f2} \\ P_{f3} \end{bmatrix}$$

S is a complex column vector defined by:

$$\begin{bmatrix} s_1 \\ s_2 \\ s_3 \end{bmatrix}$$

M is a complex matrix of size 3×8 defined by:

$$\begin{bmatrix} m_{11}m_{21} & \ldots & m_{71}m_{81} \\ m_{12}m_{22} & \ldots & m_{72}m_{82} \\ m_{13}m_{23} & \ldots & m_{73}m_{83} \end{bmatrix}$$

And ATT is a real column vector defined by:

$$\begin{bmatrix} 10^{\frac{ATT_1}{20}} \\ 10^{\frac{ATT_2}{20}} \\ \vdots \\ 10^{\frac{ATT_8}{20}} \end{bmatrix}.$$

Next, the complex response of the self-interference path at these three frequencies $f_1$, $f_2$, and $f_3$ is measured, i.e., after connecting the circulator back to coupler 310. Assume the complex interference measurement is defined by:

$$I = \begin{bmatrix} I_{f1} \\ I_{f2} \\ I_{f3} \end{bmatrix}$$

This self-interference may be measured, for example, after applying maximum attenuation levels to the attenuators. Variable I thus represents the superposition of the actual self-interference with the attenuators receiving the attenuation levels leading to cancellation response at point S, as described above. The actual self-interference is thus defined by (I−S).

Therefore, the solution to the equation:

$$(I-S)+(S+M^*\text{ATT})=0$$

which is the same as $$I+M^*\text{ATT}=0 \tag{6}$$

provides the optimum attenuation levels.

The attenuation values obtained from equation (6) are on the continuous real line and thus are rounded to the nearest attenuation values if step attenuators are used. This quantization step may lead to a less-than-optimum self-interference signal cancellation and a residual signal. In another embodiment, discrete algebra may be used to account for quantization of the attenuation levels to achieve optimal solution for the attenuation levels.

The above description applies to tuning the cancellation circuit initially. The same principle may also apply to adapting the cancellation circuit to channel changes. Any channel change may lead to non-ideal conditions leading to a small residual signal.

Assume the residual interference signal is represented by $I_{residual}$. Residual attenuation levels $\text{ATT}_{residual}$ may thus be obtained by solving the following equation:

$$I_{residual}+M^*\text{ATT}_{residual}=0$$

The residual attenuation values $\text{ATT}_{residual}$ may be subsequently used to compute new attenuation levels iteratively. Accordingly, this process is iteratively carried out until a predefined condition is satisfied.

The above embodiments of the present invention are illustrative and not limitative. For example, while the above description is applicable to a method of tuning a cancellation circuit, it is understood that in other embodiments, it is possible to measure $P_f$ and S without disconnecting the self-interference path, in which case both $P_f$ and S are offset by the self-interference path, thus resulting in achieving the same matrix M. Embodiments of the present invention are not limited by the number of taps used in the signal cancellation circuit. Nor is the invention limited by the number of frequencies used to measure responses to optimize the attenuation values. Embodiments of the present invention are not limited by the type of delay element, attenuator, passive coupler, splitter, combiner, or the like, used in the cancellation circuit. Although the above description is provided with reference to a multi-tap feed-forward cancellation circuit, it is understood that the above descriptions of the present invention are equally applicable to a multi-tap feedback cancellation circuit.

Figure 5:
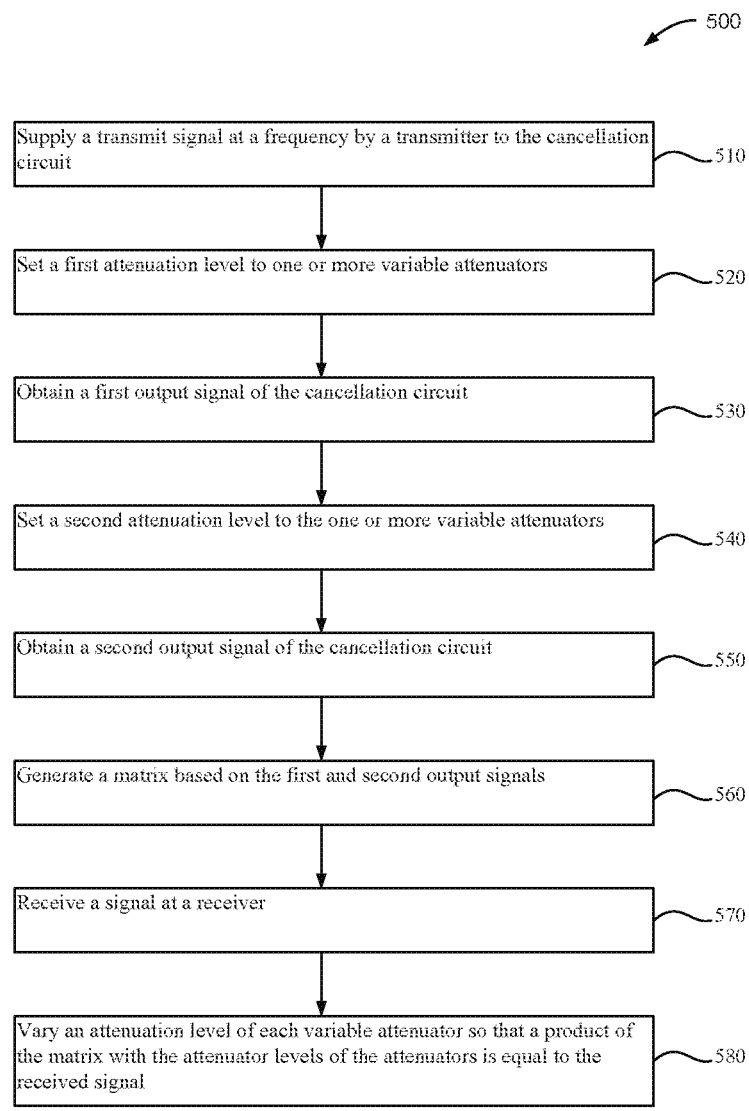
FIG. 5 is a flowchart of a method for cancelling or reducing a self-interference signal, in accordance with one embodiment of the present invention.

FIG. 5 shows a flowchart of a method 500 for canceling or reducing the self-interference signal at a receiver of a communication device, in accordance with one embodiment of the present invention. To achieve this, a sample of the transmit signal at a first frequency is supplied to the cancellation circuit at 510. Thereafter, the controller sets a first attenuation level to one or more variable attenuators at 520. A first output signal is obtained at the output of the cancellation circuit by combining output signals from all the signal paths at 530. In an embodiment, the first attenuation level may be applied to all attenuators. Next, the controller set a second attenuation level to the one or more cancellation attenuators at 540. In an embodiment, the second attenuation level may be applied to all attenuators. In an embodiment, the first attenuation may be the maximum attenuation level and the second attenuation level may be the minimum attenuation level. Thereafter, a second output signal is obtained at the output of the cancellation circuit by combining output signals from all the signal paths at 550. Note that transmit signal is a complex signal, thus, the output signals are also complex signals. Next, at 560 the communication device generates a matrix based on the first and second output signals that are obtained with the corresponding first and second attenuation levels. For example, the device may compute the matrix by solving Equation (1) or determine the matrix graphically using the plot of FIG. 4. The device may iteratively repeats the above steps 510 to 540 to generate and expand the matrix by supplying a sample of the transmit signal at a second frequency, at a third frequency, etc. In an embodiment, the matrix is determined or computed with the receiver being disconnected from the antenna or from the circulator. Next, a signal is received at the receiver at 570. The controller concurrently varies the attenuation level of each signal path so that the product of the matrix and the attenuation levels of the signal paths is substantially equal to the received signal at 580. In an embodiment, these thus obtained attenuation levels are applied to the signal paths, whose outputs are combined by combiner 315 to generate a signal representative of the self-interference signal. The reconstructed signal is subsequently subtracted from the received signal to cancel or reduce the self-interference signal at the receiver.

The above embodiments of the present invention are illustrative and not limitative. Embodiments of the present invention are not limited by the number of taps used in the signal cancellation circuit. Embodiments of the present invention are not limited by the type of delay element, attenuator, passive coupler, splitter, combiner, amplifier, or the like, used in the cancellation circuit. Embodiments of the present invention are not limited by the number of antennas used in a full-duplex wireless communication device. Embodiments of the present invention are not limited by the frequency of transmission or reception of the signal. Embodiment of the present invention are not limited by the type or number of substrates, semiconductor or otherwise, used to from a full-duplex wireless communication device. Other additions, subtractions, or modifications are obvious in view of the present disclosure and are intended to fall within the scope of the appended claims.

What is claimed is:

1. A circuit comprising:
a transmitter that transmits a transmit signal;
a plurality of signal paths, each signal path including a delay element and a variable attenuator; wherein each signal path receives a portion of the transmit signal;
a control unit that sets one or more signal paths to a first attenuation level and a second attenuation level;
a combiner that generates an output signal by combining outputs of the plurality of signal paths; and
a receiver that receives a signal,
wherein the circuit computes a matrix based on first and second output signals associated with the respective first and second attenuation levels, and
wherein the control unit concurrently varies an attenuation level of each signal path so that a product of the matrix and the attenuation level of each signal path is substantially equal to the received signal;
wherein the matrix is determined by applying sequentially a number of transmit signals having different frequencies to the signal paths;
wherein the matrix is a complex M×N matrix, M and N being positive integers, where M is the number of the different frequencies, and N is the number of the signal paths;
wherein the received signal is a complex M×1 column vector and the attenuation level of each signal path is an element of a real N×1 column vector.

2. The circuit of claim 1, further comprising:
at least one antenna for receiving the signal.

3. The circuit of claim 2, wherein each of the signal paths receives a sample of the transmit signal and generates a delayed and weighted sample of the transmit signal.

4. The circuit of claim 3, further comprising:
a plurality of passive couplers that change a phase of one or more delayed and weighted signal paths in relation to the transmit signal; and
a coupler that subtracts the product from a received signal.

5. The circuit of claim 1, wherein the matrix is determined with a fast Fourier transform (FFT) of a single wideband transmit signal.

6. The circuit of claim 1, further comprising a circulator having a first port coupled to an antenna, a second port coupled to a transmit line of the circuit, and a third port coupled to a receive line of the circuit.

7. The circuit of claim 6, wherein the third port of the circulator is disconnected from the receiver while the circuit is computing the matrix.

8. The circuit of claim 7, wherein the third port of the circulator is connected to the receiver while the control unit concurrently varies the attenuation level of each signal path to minimize the sum of the product and the received signal.

9. The circuit of claim 1, wherein the first attenuation level is a maximum attenuation level and the second attenuation level is a minimum attenuation level.

10. The circuit of claim 1, wherein the control unit iteratively varies the attenuation level of each variable attenuator until a sum of the product and the received signal satisfies a predefined condition.

11. A method for performing a self-interference signal cancellation in a full-duplex wireless communication system with a cancellation circuit having a plurality of parallel signal paths, each of the signal paths including a delay element and a variable attenuator, the method comprising:
supplying a first sample of a transmit signal at a first frequency by a transmitter to the cancellation circuit;
setting a first attenuation level to one or more of the variable attenuators;
obtaining a first output signal of the cancellation circuit;
setting a second attenuation level to the one or more of the variable attenuators;
obtaining a second output signal of the cancellation circuit;
generating a matrix based on the first and second output signals;
receiving a signal at a receiver; and
varying an attenuation level of each of the variable attenuators so that a product of the matrix and the attenuation levels of the variable attenuators is substantially equal to the received signal;
wherein generating a matrix comprises iteratively performing the following steps:
supplying a second sample of the transmit signal at a second frequency by the transmitter to the cancellation circuit;
setting the first attenuation level to the one or more of the variable attenuators;
obtaining a third output signal of the cancellation circuit;
setting the second attenuation level to the one or more of the variable attenuators;
obtaining a fourth output signal of the cancellation circuit; and
expanding the matrix based on the third and fourth output signals.

12. The method of claim 11, wherein varying an attenuation level of each of the variable attenuators is performed concurrently.

13. The method of claim 11, wherein the matrix is a complex M×N matrix, M and N being positive integers, where M is a number of different frequencies of the transmit signal and N is a number of the plurality of signal paths.

14. The method of claim 11, wherein generating a matrix is without connecting the transmitter to an antenna.

15. The method of claim 11, wherein the received signal at the receiver is through an antenna while a maximum attenuation level is applied to the attenuators.

16. The method of claim 11, wherein the first output signal or the second output signal is obtained by combining outputs from all of the plurality of signal paths.

17. The method of claim 11, wherein the first attenuation level is a maximum attenuation.

18. The method of claim 11, wherein the second attenuation level is a minimum attenuation.

19. The method of claim 11, wherein the first and second attenuation levels are applied to all variable attenuators of the plurality of parallel signal paths.

20. The method of claim 11, wherein the transmit signal is a complex signal.

21. The method of claim 11, wherein varying an attenuation level of each of the variable attenuators comprises iteratively carrying out a tuning of the attenuation of each of the variable attenuators until a sum of the product and the received signal satisfies a predefined condition.

22. A circuit comprising:
a transmitter that transmits a transmit signal;
a plurality of signal paths, each signal path including a delay element and a variable attenuator; wherein each signal path receives a portion of the transmit signal;
a control unit that sets one or more signal paths to a first attenuation level and a second attenuation level;
a combiner that generates an output signal by combining outputs of the plurality of signal paths;
a circulator having a first port coupled to an antenna, a second port coupled to a transmit line of the circuit, and a third port coupled to a receive line of the circuit; and
a receiver that receives a signal,
wherein the circuit computes a matrix based on first and second output signals associated with the respective first and second attenuation levels, and
wherein the control unit concurrently varies an attenuation level of each signal path so that a product of the matrix and the attenuation level of each signal path is substantially equal to the received signal;
wherein the third port of the circulator is disconnected from the receiver while the circuit is computing the matrix;
wherein the third port of the circulator is connected to the receiver while the control unit concurrently varies the attenuation level of each signal path to minimize the sum of the product and the received signal.

23. The circuit of claim 22, further comprising:
at least one antenna for receiving the signal.

24. The circuit of claim 23, wherein each of the signal paths receives a sample of the transmit signal and generates a delayed and weighted sample of the transmit signal.

25. The circuit of claim 24, further comprising:
a plurality of passive couplers that change a phase of one or more delayed and weighted signal paths in relation to the transmit signal; and
a coupler that subtracts the product from a received signal.

26. The circuit of claim 22, wherein the matrix is determined with a fast Fourier transform (FFT) of a single wideband transmit signal.

27. The circuit of claim 22, wherein the first attenuation level is a maximum attenuation level and the second attenuation level is a minimum attenuation level.

28. The circuit of claim 22, wherein the control unit iteratively varies the attenuation level of each variable attenuator until a sum of the product and the received signal satisfies a predefined condition.

* * * * *